Sept. 3, 1946.  M. CURTZE  2,406,745
MEANS FOR CAPPING TUBING
Filed Jan. 21, 1943
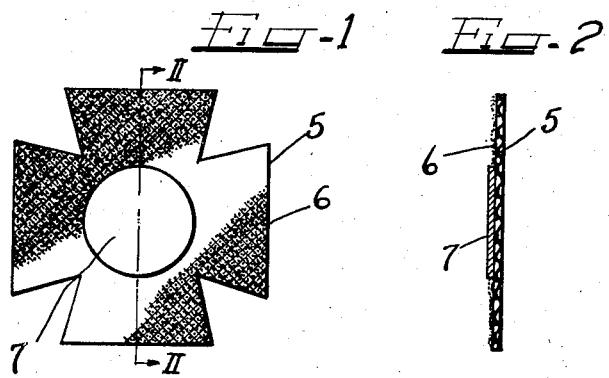
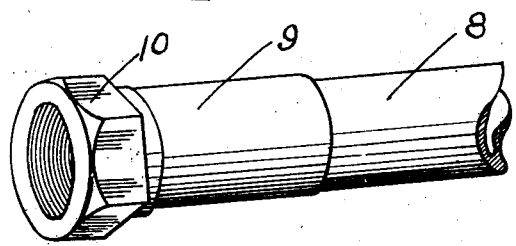
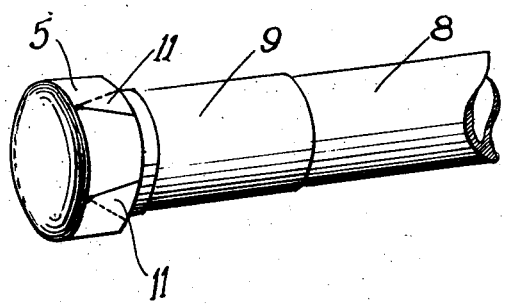
Inventor
Max Curtze.
by Charles W. Hills Attys.

Patented Sept. 3, 1946

2,406,745

UNITED STATES PATENT OFFICE 2,406,745

MEANS FOR CAPPING TUBING

Max Curtze, Los Angeles, Calif., assignor to The Scholl Mfg. Co., Inc., Chicago, Ill., a corporation of New York Application January 21, 1943, Serial No. 473,059

4 Claims. (Cl. 138—89)

This invention relates to improvements in means for capping tubing, pipe, conduit, or the like, which tubing or similar structure may be ultimately used to carry gas, gasoline, oil, air, water, or some other fluid.

In connection with the manufacture of various machines and mechanism, and especially in the manufacture of war materials, considerable tubing, pipe, conduit, or the like is utilized as lines for gas, gasoline, oil, air, water, or other fluid. This tubing, after being made or after being received from a manufacturer, in most cases requires a number of operations to be performed on the tubing, or a number of nipples, unions, elbows, or similar fittings to be added to the tubing prior to the ultimate and final installation of the tubing in a particular mechanism. It is desirable to keep the ends of the tubing closed during all of the operations thereon or additions thereto when work is actually not being performed on the tubing, so as to prevent undesirable or unintentional introduction of foreign matters or substances into the tubing, and further, as a means of discouraging sabotage. However, the covering of the tubing ends in between operations on the tubing should be such as not to add materially to the necessary labor in connection with the tubing and not to add materially to the expense of the ultimate installation of the tubing.

With the foregoing in mind, it is an important object of the instant invention to provide a method of and means for very economically and simply capping tubing in a temporary manner.

Another object of the invention resides in the provision of a method of and means for quickly and easily capping tubing temporarily in a manner and by means which, to a reasonable extent, will denote tampering with the capping material.

Another object of the invention is the provision of capping means for the ends of tubing, which means are simple in construction, highly economical to use, and which effectively close the tubing ends, keeping out dirt, moisture, and other foreign matter, the means being as simple in removal as in application.

A further object of the invention is the provision of capping means for the ends of tubing, which means are of such construction as to be simply applied to the tubing and removed therefrom by hand, not requiring any apparatus for this purpose.

A further object of the invention is the provision of means for temporarily capping tubing, which means are efficient in operation, easily applied, and sufficiently economical to warrant discarding after a single usage.

It is also a feature of this invention to provide means for temporarily capping tubing, which means are equipped with non-hardening adhesive for easy and ready application and removal, and which means also are shaped to provide pulled over portions when the tubing is capped, which aid in indicating tampering with the capped tubing if such occurs.

While some of the more salient features, characteristics and advantages of the instant invention have been above pointed out, others will become apparent from the following disclosures, taken in conjunction with the accompanying drawing, in which:

Figure 1 is an inside face of tubing capping means embodying principles of the instant invention;

Figure 2 is a vertical sectional view of the structure of Figure 1 taken substantially as indicated by the section line II—II of Figure 1, looking in the direction of the arrows;

Figure 3 is a fragmentary projectional view of a piece of tubing with which the instant invention may be associated; and Figure 4 is a fragmentary projectional view similar to Figure 3, showing the tubing of Figure 3 capped with the structure of Figures 1 and 2.

As shown on the drawing:

In the illustrated embodiment of this invention, with reference more particularly to Figures 1 and 2, there is shown a device for temporarily capping a tubing, pipe, conduit, or the like. The device includes a fabric member 5 having an adhesive surface 6, and the member in the illustrated instance is shaped generally in the form of a Maltese cross. This member may be made of any suitable material, but is preferably of a rather substantial fabric of the character commonly used in the manufacture of the commonly known adhesive tape employed for surgical purposes. Also, the member may be of the character of the so-called "Scotch" tape insofar as the adhesive surface is concerned. In any event, it is desirable that the member should have an adhesive surface of the pressure sensitive type permitting attachment and removal. In other words, a non-hardening adhesive.

Preferably centrally disposed upon the adhesive member and held thereto by attachment to the adhesive surface 6 is a disk 7 which may be of any suitable material, but which is preferably of a relatively stiff material, compressed fibre being a satisfactory substance. This disk is of a size to fit neatly within the end of the tubing or conduit to be capped, and it will be understood that various sized capping devices will be used for various sizes of tubing or conduit.

In Figure 3, merely by way of illustrative example, a conduit arrangement is shown which includes a length of tubing 8 to one end of which a sleeve 9 and a connection member such as a bushing 10 or the equivalent is attached. The device of Figures 1 and 2 may be used to cap the structure of Figure 3 by placing the disk 7 in the opening at the end of the bushing 10, and then folding the arms of the cross-shaped device down over the nut portion of the bushing as clearly shown in Figure 4. It will be noted that in this folding process certain overlapping portions at the side edges of the arms of the cross-shaped device will occur as indicated at 11 so that there will be a complete coverage of the end of the conduit or tubing as far back as the skirt of the attached device extends. When it is desired to remove the capping device, it is a simple expedient to pull up the arm portions of the device and rip or jerk it off the end of the conduit. The device may be discarded after a single usage, owing to its economical construction.

When working upon a tubing, pipe, or the equivalent, the tubing naturally will be moved from place to place in the factory for different operations, or from factory to factory possibly, before the manufactured piece of tubing is ultimately and finally installed in a mechanism such as an internal combustion engine, for example. The tubing is capped first when made, then capped again when it is cut into the desired lengths, possibly capped when it is shaped, and capped each time additional fittings are added to it, so that whenever the tubing is not being worked upon, both ends of it are covered with a cap.

It will be noted that in view of the tacky adhesive surface on the capping device, it would be difficult to remove the device and then replace it exactly as it was before without leaving some trace of tampering.

If so desired, a capping device may be used repeatedly until the adhesive surface thereof has been rendered ineffective to an unsatisfactory extent, and the devices may be provided with some identifying indicia on the outer surface, if desired.

From the foregoing, it is apparent that I have provided novel means for capping tubing and the like. It will be appreciated that the capping means when in place on the tubing effectively protect internal threads and prevent the introduction into the tubing of any foreign matter between operations on the tubing and prior to the time it is finally installed in the mechanism with which it is to be associated. Further, it will be appreciated that the capping is extremely economical to use, no tools being necessary to manipulate the capping devices, and the devices themselves are sufficiently economical to warrant discarding after a single usage. Further, the construction of the capping device is such as to make it function to a considerable extent as a tell-tale in the event of unauthorized tampering with the tubing.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A device for temporarily capping tubing, including a sheet of material having an adhesive surface for application directly to the tubing over the end of a length of tubing, and a relatively stiff disk carried by said sheet for insertion in the end of the tubing when the sheet is applied.

2. A device for temporarily capping tubing, including a flexible piece of material having a pressure sensitive adhesive surface, and a member for disposition across the opening in said tubing, said member being carried on said adhesive surface.

3. A device for temporarily capping tubing, including a piece of fabric having a surface of tacky non-hardening adhesive for disposition over the open end of a length of tubing, and a plug for the end of the tubing in the form of a pressed fibre disk attached to said adhesive surface.

4. A device for temporarily capping tubing, including a flexible piece of material having a pressure sensitive adhesive surface, said piece of material being shaped generally in the form of a Maltese cross with legs of sufficient width that they will overlap each other when folded over the outside surface of a piece of tubing with the end of the tubing in a substantially central location with respect to the piece of material, and a member carried by said piece of material for disposition across the end of the tubing.

MAX CURTZE.